United States Patent
Chung

(10) Patent No.: US 11,010,581 B2
(45) Date of Patent: May 18, 2021

(54) FINGERPRINT SENSING APPARATUS AND METHOD HAVING THREE-DIMENSIONAL SENSING MECHANISM

(71) Applicant: NOVATEK Microelectronics Corp., Hsinchu (TW)

(72) Inventor: Jung-Chen Chung, Hsinchu County (TW)

(73) Assignee: NOVATEK Microelectronics Corp., Hsinchu (TW)

(*) Notice: Subject to any disclaimer, the term of this patent is extended or adjusted under 35 U.S.C. 154(b) by 44 days.

(21) Appl. No.: 16/431,720

(22) Filed: Jun. 4, 2019

(65) Prior Publication Data
US 2020/0387687 A1 Dec. 10, 2020

(51) Int. Cl.
*G06K 9/00* (2006.01)

(52) U.S. Cl.
CPC ..... *G06K 9/00026* (2013.01); *G06K 9/00087* (2013.01)

(58) Field of Classification Search
CPC .......... G06K 9/00026; G06K 9/00919; G06K 9/00087; G06K 9/209; G06K 2009/0006
See application file for complete search history.

(56) References Cited

U.S. PATENT DOCUMENTS

| 2013/0169780 | A1* | 7/2013 | Wu | G06K 9/00026 348/77 |
| 2014/0375786 | A1* | 12/2014 | Mankowski | G06K 9/00033 348/77 |
| 2016/0180485 | A1* | 6/2016 | Avila | G06K 9/6201 382/154 |
| 2018/0276361 | A1* | 9/2018 | Seo | G06K 9/00013 |
| 2019/0180133 | A1* | 6/2019 | Shannon | G06T 7/11 |

* cited by examiner

*Primary Examiner* — Premal R Patel
(74) *Attorney, Agent, or Firm* — CKC & Partners Co., LLC

(57) ABSTRACT

A fingerprint sensing apparatus having a three-dimensional (3-D) sensing mechanism that includes optical fingerprint sensing circuits and a processing circuit is provided. The optical fingerprint sensing circuits are configured to perform sensing within sensing areas to obtain sensed images, wherein each of the sensing areas corresponds to one of the optical fingerprint sensing circuits and the sensing areas includes at least one overlapped area. The processing circuit is electrically coupled to the optical fingerprint sensing circuits to receive the sensed images and generate a three-dimensional sensed image having depth information of the overlapped area according to a disparity between the sensed images.

10 Claims, 4 Drawing Sheets

FINGERPRINT SENSING APPARATUS AND METHOD HAVING THREE-DIMENSIONAL SENSING MECHANISM

BACKGROUND

Field of Invention

The present invention relates to a fingerprint sensing technology. More particularly, the present invention relates to a fingerprint sensing apparatus and a fingerprint sensing method having a three-dimensional sensing mechanism.

Description of Related Art

With increasing demand for tougher security, electronic devices such as smartphones have unanimously adopted optical fingerprint sensors as they can be embedded underneath the display glass and only require a small area footprint. However, the optical fingerprint sensing technology mainly performing sensing on a two-dimensional surface. When an ultra-high resolution photo of a fingerprint is used, the two-dimensional optical fingerprint sensing technology may fail to identify such a photo as a fake fingerprint.

Accordingly, what is needed is a fingerprint sensing apparatus and a fingerprint sensing method having a three-dimensional sensing mechanism to address the issues mentioned above.

SUMMARY

An aspect of the present invention is to provide a fingerprint sensing apparatus having a three-dimensional (3-D) sensing mechanism that includes a plurality of optical fingerprint sensing circuits and a processing circuit. The optical fingerprint sensing circuits are configured to perform sensing within a plurality of sensing areas to obtain a plurality of sensed images, wherein each of the sensing areas corresponds to one of the optical fingerprint sensing circuits and the sensing areas includes at least one overlapped area. The processing circuit is electrically coupled to the optical fingerprint sensing circuits to receive the sensed images and generate a three-dimensional sensed image having depth information of the overlapped area according to a disparity between the sensed images.

Another aspect of the present invention is to provide a fingerprint sensing method having a three-dimensional sensing mechanism used in a fingerprint sensing apparatus that includes the steps outlined below. Sensing within a plurality of sensing areas is performed by a plurality of optical fingerprint sensing circuits to obtain a plurality of sensed images, wherein each of the sensing areas corresponds to one of the optical fingerprint sensing circuits and the sensing areas includes at least one overlapped area. The sensed images are received and a three-dimensional sensed image having depth information of the overlapped area is generated according to a disparity between the sensed images by a processing circuit electrically coupled to the optical fingerprint sensing circuits.

These and other features, aspects, and advantages of the present invention will become better understood with reference to the following description and appended claims.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
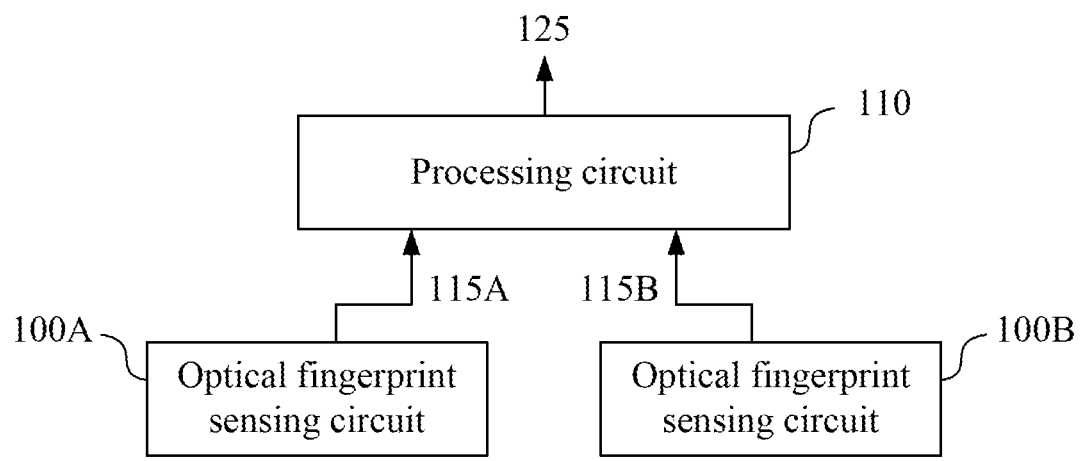
FIG. 1 is a diagram of a block diagram of a fingerprint sensing apparatus having a three-dimensional sensing mechanism in an embodiment of the present invention.
Figure 2:
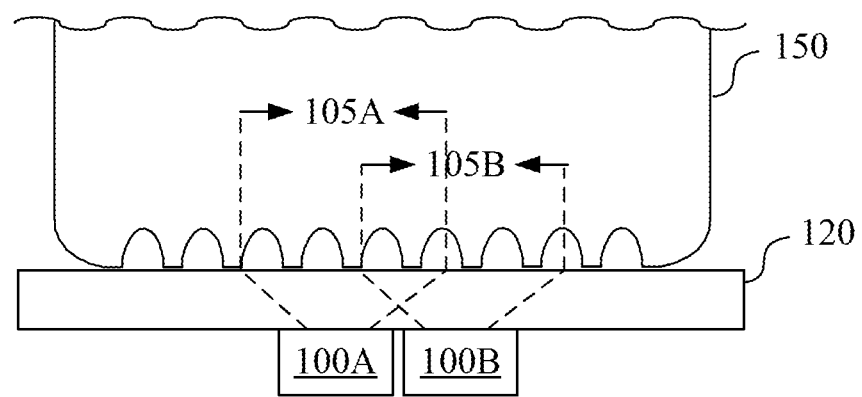
FIG. 2 is a cross-sectional view of the optical fingerprint sensing circuits in FIG. 1 in an embodiment of the present invention.

Reference is made to FIG. 1 and FIG. 2 at the same time. FIG. 1 is a diagram of a block diagram of a fingerprint sensing apparatus 1 having a three-dimensional sensing mechanism in an embodiment of the present invention. The fingerprint sensing apparatus 1 includes optical fingerprint sensing circuits 100A and 100B and a processing circuit 110. FIG. 2 is a cross-sectional view of the optical fingerprint sensing circuits 100A and 100B in FIG. 1 in an embodiment of the present invention.

The optical fingerprint sensing circuits 100A and 100B are configured to perform sensing within sensing areas 105A and 105B illustrated in FIG. 2 to obtain sensed images 115A and 115B. In the present embodiment, since there are only two optical fingerprint sensing circuits 100A and 100B that obtain two sensed images 115A and 115B, the optical fingerprint sensing circuit 100A can be a left sensing circuit to obtain a left image and the optical fingerprint sensing circuit 100B can be a right sensing circuit to obtain a right image.

In an embodiment, a glass 120 can be selectively disposed on the optical fingerprint sensing circuits 100A and 100B such that when an object 150, e.g. a finger, is disposed on the glass 120, the optical fingerprint sensing circuits 100A and 100B perform sensing accordingly.

As illustrated in FIG. 2, the sensing area 105A corresponds to the optical fingerprint sensing circuit 100A. The sensing area 105B corresponds to the optical fingerprint sensing circuit 100B.

Figure 3A:
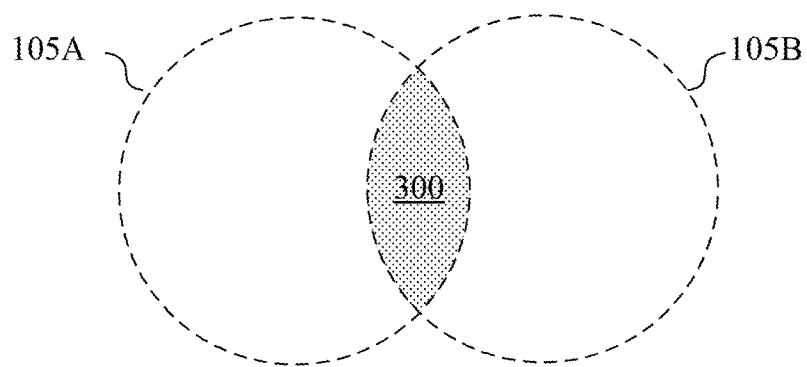
FIG. 3A is a diagram of a top view of the sensing areas in FIG. 2 in an embodiment of the present invention.
Figure 3B:
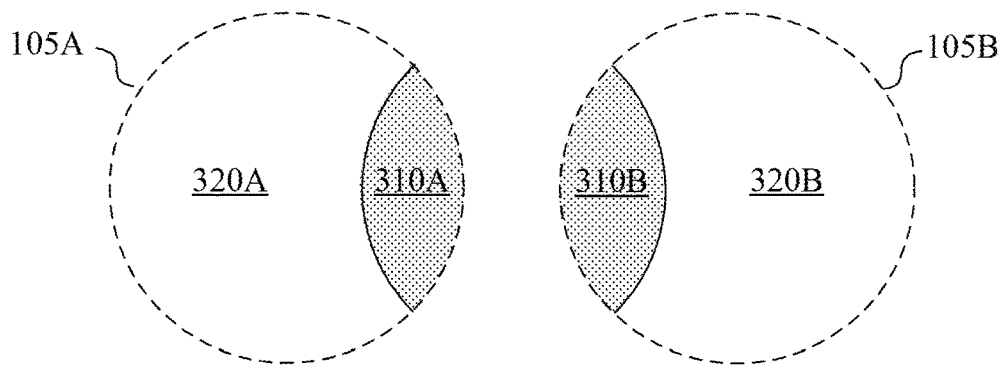
FIG. 3B is a diagram of the sensing areas in FIG. 3A that are illustrated separately in an embodiment of the present invention.

Reference is now made to FIG. 3A and FIG. 3B at the same time. FIG. 3A is a diagram of a top view of the sensing areas 105A and 105B in FIG. 2 in an embodiment of the present invention. FIG. 3B is a diagram of the sensing areas 105A and 105B in FIG. 3A that are illustrated separately in an embodiment of the present invention.

As illustrated in FIG. 3A, an overlapped area 300 is included in the sensing areas 105A and 105B. As a result, in FIG. 3B, when the sensing areas 105A and 105B are illustrated separately, the sensing areas 105A substantially includes an overlapped area 310A corresponding to the overlapped area 300 in FIG. 3A and a non-overlapped area 320A. The sensing areas 105B substantially includes an overlapped area 310B corresponding to the overlapped area 300 in FIG. 3A and a non-overlapped area 320B.

The processing circuit 110 is electrically coupled to the optical fingerprint sensing circuits 100A and 100B to receive the sensed images 115A and 115B and generate a three-dimensional sensed image 125 having depth information of the overlapped area 300 according to a disparity between the sensed images 115A and 115B.

In an embodiment, when the processing circuit 110 receives the sensed images 115A and 115B, the processing circuit 110 is further configured to perform an image distortion correction and image calibration on the sensed images 115A and 115B, determine corresponding characteristics between the sensed images 115A and 115B, generate a disparity map according to the corresponding characteristics and perform a distance calibration and conversion to generate the three-dimensional sensed image 125 having the depth information.

The process to generate the depth information of the overlapped area 300 is described below in accompany with the configuration of the optical fingerprint sensing circuits 100A and 100B illustrated in FIG. 4 and the following paragraphs.

Figure 4:
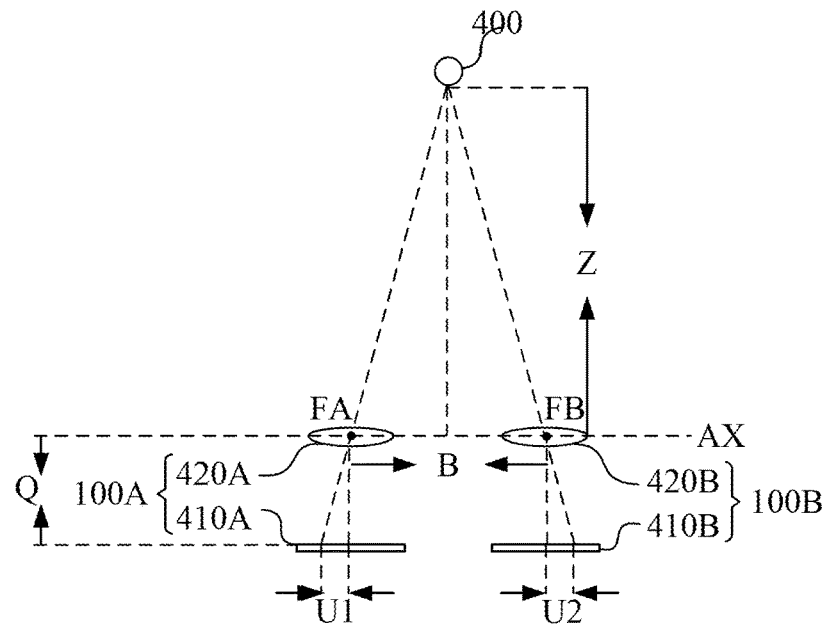
FIG. 4 is a diagram illustrating detail configuration of the optical fingerprint sensing circuits and a sensed object in an embodiment of the present invention.

Reference is now made to FIG. 4. FIG. 4 is a diagram illustrating detail configuration of the optical fingerprint sensing circuits 100A and 100B and a sensed object 400 in an embodiment of the present invention. It is appreciated that the sensed object 400 illustrated in FIG. 4 can be a spot of the sensed object 150 in FIG. 1.

As illustrated in FIG. 4, the optical fingerprint sensing circuit 100A includes an optical fingerprint sensor 410A and a lens 420A disposed between the sensed object 400 and the optical fingerprint sensor 410A. The optical fingerprint sensing circuit 100B includes an optical fingerprint sensor 410B and a lens 420B disposed between the sensed object 400 and the optical fingerprint sensor 410B. The lens 420A and the lens 420B form an axis AX.

In an embodiment, the center of the optical fingerprint sensor 410A is aligned to a focal point FA of the lens 420A. The optical fingerprint sensor 410A is distanced from the focal point FA of the lens 420A by a distance Q. Similarly, the center of the optical fingerprint sensor 410B is aligned to a focal point FB of the lens 420B. The optical fingerprint sensor 410B is distanced from the focal point FB of the lens 420B by also the distance Q.

The focal point FA and the focal point FB are distanced from each other by a distance B. The sensed object 400 is vertically distanced from the axis AX by a distance Z. A projected point PA formed by projecting the sensed object 400 through the focal point FA to the optical fingerprint sensor 410A is distanced from the center of the optical fingerprint sensor 410A by a distance U1. A projected point PB formed by projecting the sensed object 400 through the focal point FB to the optical fingerprint sensor 410B is distanced from the center of the optical fingerprint sensor 410B by a distance U2.

The depth information that includes the distance Z can be calculated by the following equation:

$$Z = B \times (Q/(U1+U2)).$$

As a result, based on the configuration of the optical fingerprint sensing circuits 100A and 100B and the position of the sensed object 400, the depth information of the sensed object 400 in the overlapped area 300 can be obtained.

As illustrated in FIG. 2, when the object 150 is a finger of a human, the object 150 may include a plurality of recessed portions (valley portions) 155A and a plurality of fingerprint protrusion portions (ridge portions) 155B. Since the sensed object 400 illustrated in FIG. 4 can be a spot of the sensed object 150 in FIG. 1, all the spots on the sensed object 150 within the overlapped area 300 can be sensed by using the same mechanism.

In an embodiment, when the depth information of all the spots on the sensed object 150 is obtained, the disparity map can be generated accordingly.

It is appreciated that only the overlapped area 300 in the sensed images 115A and 115B includes the depth information since such the overlapped area 300 includes the information from the different directions, i.e. the information in the overlapped areas 310A and 310B in FIG. 3B. On the contrary, the non-overlapped areas 320A and the 320B that include the information from only one direction do not include the depth information.

The processing circuit 110 is further configured to compare the depth information in the three-dimensional sensed image 125 with pre-stored fingerprint data 135 to perform fingerprint identification. In an embodiment, the pre-stored fingerprint data 135 is stored in a storage circuit (not illustrated) in the fingerprint sensing apparatus 1.

In an embodiment, when the depth information in the three-dimensional sensed image 125 matches the pre-stored fingerprint data 135, the sensed object 150 passes the fingerprint identification. More specifically, the processing circuit 110 identifies the object 150 as a known object and proceeds to perform corresponding operation, e.g. turning an electronic device (not illustrated) including the fingerprint sensing apparatus 1 to a power-on status.

Under such a condition, when either the depth information indicates that a corresponding sensed object has a flat surface or the depth information does not match the pre-stored fingerprint data 135, the processing circuit 110 determines that the sensed object 150 fail to pass the fingerprint identification.

In another embodiment, the processing circuit 110 is configured to compare both the depth information in the overlapped area 300 (i.e. the overlapped areas 310A and 310B) and information of the non-overlapped areas 320A and the 320B in the three-dimensional sensed image 125 with the pre-stored fingerprint data 135 to perform fingerprint identification. When both the depth information in the overlapped area 300 and the information of the non-overlapped areas 320A and the 320B match the pre-stored fingerprint data 135, the sensed object 150 passes the fingerprint identification.

Under such a condition, when at least one of the depth information in the overlapped area 300 and the information of the non-overlapped areas 320A and the 320B does not match pre-stored fingerprint data 135, the sensed object 150 fails to passes the fingerprint identification.

As a result, the fingerprint sensing apparatus 1 of the present invention can retrieve the depth information of the sensed images 115A and 115B to generate the three-dimensional sensed image 125 such that the fingerprint identification can be performed based on the depth information. An identification process having higher security level can be accomplished.

It is appreciated that in the embodiments described above, two optical fingerprint sensing circuits 100A and 100B are illustrated as an example. In other embodiments, the number of the optical fingerprint sensing circuits 100A and 100B can be any number that is larger than two.

Figure 5:
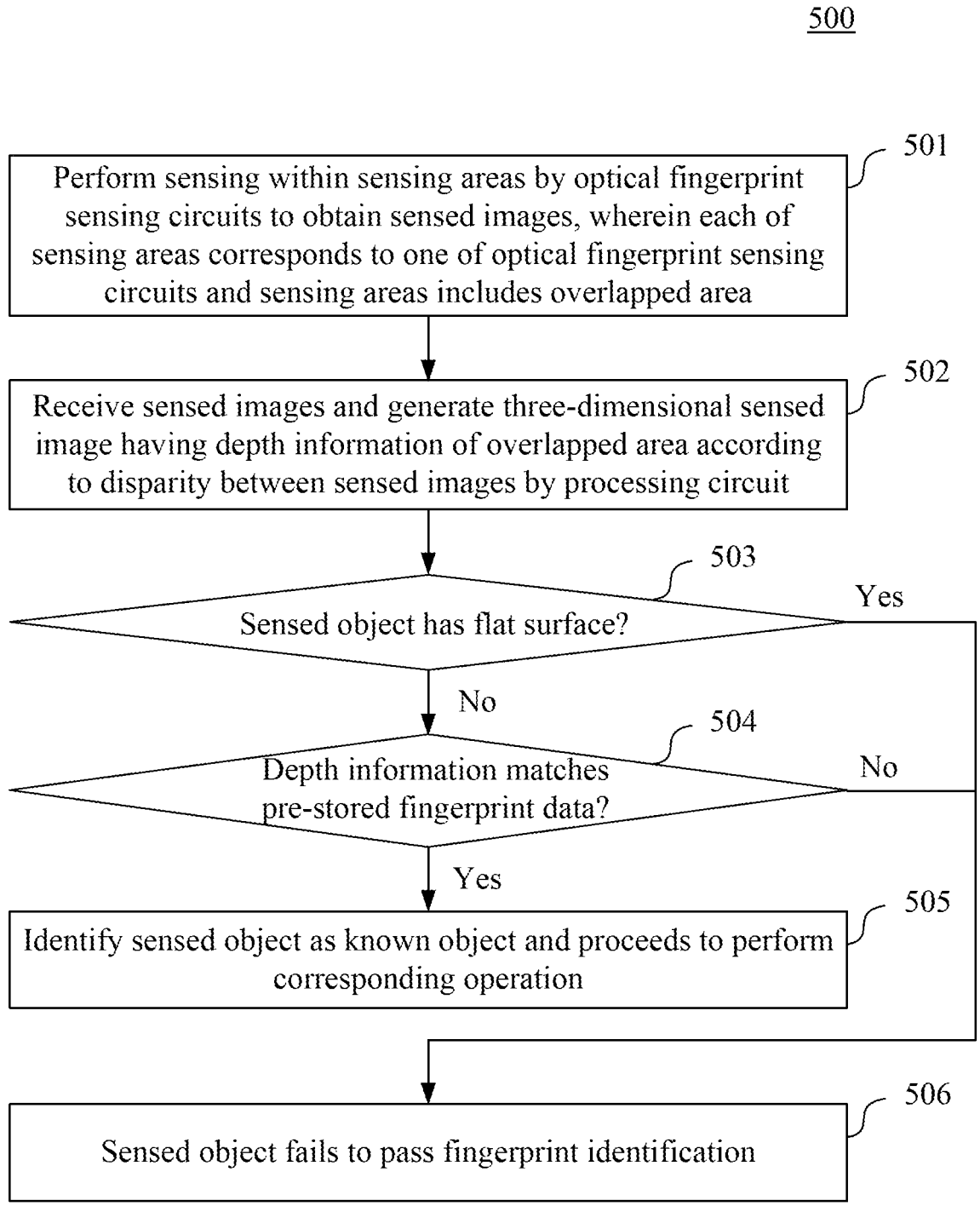
FIG. 5 is a fingerprint sensing method in an embodiment of the present invention.

Reference is now made to FIG. 5. FIG. 5 is a fingerprint sensing method 500 in an embodiment of the present invention. The fingerprint sensing method 500 can be used in the fingerprint sensing apparatus 1 illustrated in FIG. 1. The fingerprint sensing method 500 includes the operations outlined below (The operations are not recited in the sequence in which the operations are performed. That is, unless the sequence of the operations is expressly indicated, the sequence of the operations is interchangeable, and all or part of the steps may be simultaneously, partially simultaneously, or sequentially performed).

In step 501, sensing within the sensing areas 105A and 105B is performed by the optical fingerprint sensing circuits 100A and 100B to obtain the sensed images 115A and 115B, wherein each of the sensing areas 105A and 105B corresponds to one of the optical fingerprint sensing circuits 100A and 100B and the sensing areas 105A and 105B includes the overlapped area 300.

In an embodiment, the sensed images 115A and 115B can be a left image and a right image.

In an embodiment, an off-line calibration process is performed before the performance of sensing. The off-line calibration process may include such as, but not limited to a left and right sensors internal parameters and distortion correction process and an image calibration process performed based on a left calibrated image and a right calibrated image. After the off-line calibration process, a calibration table and related parameters for the left image and the right image can be obtained.

In step 502, the sensed images 115A and 115B are received and a three-dimensional sensed image 125 having depth information of the overlapped area 300 is generated according to the disparity between the sensed images 115A and 115B by the processing circuit 110.

Figure 6:
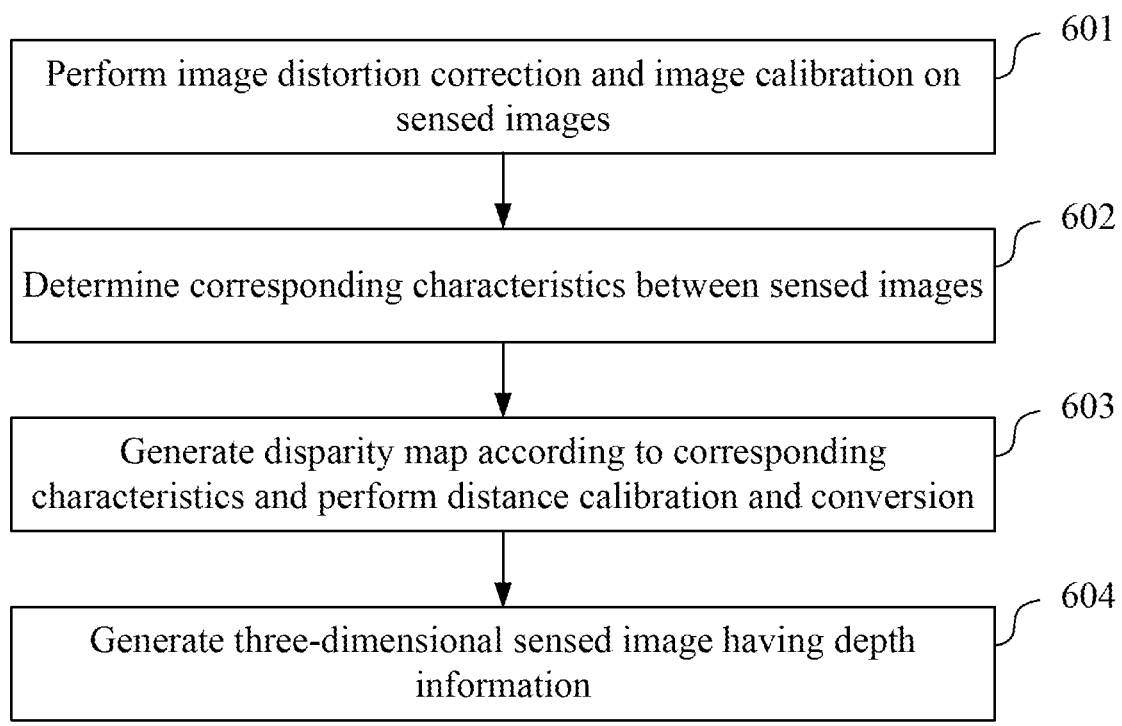
FIG. 6 is a detailed flow of a method to perform the step 502 in FIG. 5 in an embodiment of the present invention.

Reference is now made to FIG. 6. FIG. 6 is a detailed flow of a method 600 to perform the step 502 in FIG. 5 in an embodiment of the present invention.

In step 601, an image distortion correction and image calibration are performed on the sensed images 115A and 115B. In an embodiment, the correction and the calibration can be performed in real-time according to the calibration table and the related parameters for the left image and the right image obtained according to the off-line calibration process.

In step 602, corresponding characteristics between the sensed images 115A and 115B are determined.

In step 603, a disparity map is generated according to the corresponding characteristics and a distance calibration and conversion is performed.

In step 604, the three-dimensional sensed image 125 having the depth information is generated.

In an embodiment, the flow in FIG. 5 further goes to step 503 after step 502, in which in step 503, whether the depth information indicates that the sensed object 150 has the flat surface is determined.

When the depth information indicates that the sensed object 150 does not have the flat surface, in step 504, whether the depth information matches the pre-stored fingerprint data 135 is determined.

When the depth information does not match the pre-stored fingerprint data 135, in step 505, the processing circuit 110 identifies the object 150 as a known object and proceeds to perform corresponding operation.

When either the depth information indicates that the sensed object 150 has the flat surface or when the depth information does not match the pre-stored fingerprint data 135, in step 506, the sensed object 150 fails to pass the fingerprint identification.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A fingerprint sensing apparatus having a three-dimensional (3-D) sensing mechanism, comprising:
    a plurality of optical fingerprint sensing circuits configured to perform sensing within a plurality of sensing areas to obtain a plurality of sensed images, wherein each of the sensing areas corresponds to one of the optical fingerprint sensing circuits and the sensing areas comprises at least one overlapped area; and
    a processing circuit electrically coupled to the optical fingerprint sensing circuits to receive the sensed images and generate a three-dimensional sensed image having depth information of the overlapped area according to a disparity between the sensed images;
    wherein the sensing areas further comprises a plurality of non-overlapped areas, and the processing circuit is configured to compare both the depth information in the overlapped area and direction information of the non-overlapped areas in the three-dimensional sensed image with the pre-stored fingerprint data to perform fingerprint identification.

2. The fingerprint sensing apparatus of claim 1, wherein when either the depth information indicates that a corresponding sensed object has a flat surface or the depth information does not match the pre-stored fingerprint data, the processing circuit determines that the sensed object fail to pass the fingerprint identification.

3. The fingerprint sensing apparatus of claim 1, wherein the optical fingerprint sensing circuits comprises:
    a first optical fingerprint sensing circuit comprising:
        a first optical fingerprint sensor; and
        a first lens disposed between a sensed object and the first optical fingerprint sensor; and
    a second optical fingerprint sensing circuit comprising:
        a second optical fingerprint sensor; and
        a second lens disposed between the sensed object and the second optical fingerprint sensor and configured to form an axis with the first lens.

4. The fingerprint sensing apparatus of claim 3, wherein the first optical fingerprint sensor is distanced from a first focal point of the first lens by a first distance Q, the second optical fingerprint sensor is distanced from a second focal point of the second lens by the first distance Q, the first focal point and the second focal point are distanced from each other by a second distance B, the sensed object is vertically distanced from the axis by a third distance Z, a first projected point formed by projecting the sensed object through the first focal point to the first optical fingerprint sensor is distanced from a first center of the first optical fingerprint sensor by a fourth distance U1 and a second projected point formed by projecting the sensed object through the second focal point to the second optical fingerprint sensor is distanced from a second center of the second optical fingerprint sensor by a fifth distance U2;
    wherein the depth information comprise the third distance Z that is calculated by the following equation:

$Z=B\times(Q/(U1+U2))$.

5. The fingerprint sensing apparatus of claim 1, wherein the processing circuit is further configured to perform an image distortion correction and image calibration on the sensed images, determine corresponding characteristics between the sensed images, generate a disparity map according to the corresponding characteristics and perform a distance calibration and conversion to generate the three-dimensional sensed image having the depth information.

6. A fingerprint sensing method having a three-dimensional sensing mechanism used in a fingerprint sensing apparatus, comprising:
performing sensing within a plurality of sensing areas by a plurality of optical fingerprint sensing circuits to obtain a plurality of sensed images, wherein each of the sensing areas corresponds to one of the optical fingerprint sensing circuits and the sensing areas comprises at least one overlapped area, and the sensing areas further comprises a plurality of non-overlapped areas;
receiving the sensed images and generating a three-dimensional sensed image having depth information of the overlapped area according to a disparity between the sensed images by a processing circuit electrically coupled to the optical fingerprint sensing circuits; and
comparing both the depth information in the overlapped area and direction information of the non-overlapped areas in the three-dimensional sensed image with the pre-stored fingerprint data to perform fingerprint identification by the processing circuit.

7. The fingerprint sensing method of claim 6, further comprising:
when either the depth information indicates that a corresponding sensed object has a flat surface or the depth information does not match the pre-stored fingerprint data, determining that the sensed object fail to pass the fingerprint identification by the processing circuit.

8. The fingerprint sensing method of claim 6, wherein the optical fingerprint sensing circuits comprises:
a first optical fingerprint sensing circuit comprising:
a first optical fingerprint sensor; and
a first lens disposed between a sensed object and the first optical fingerprint sensor; and
a second optical fingerprint sensing circuit comprising:
a second optical fingerprint sensor; and
a second lens disposed between the sensed object and the second optical fingerprint sensor and configured to form an axis with the first lens.

9. The fingerprint sensing method of claim 8, wherein the first optical fingerprint sensor is distanced from a first focal point of the first lens by a first distance Q, the second optical fingerprint sensor is distanced from a second focal point of the second lens by the first distance Q, the first focal point and the second focal point are distanced from each other by a second distance B, the sensed object is vertically distanced from the axis by a third distance Z, a first projected point formed by projecting the sensed object through the first focal point to the first optical fingerprint sensor is distanced from a first center of the first optical fingerprint sensor by a fourth distance U1 and a second projected point formed by projecting the sensed object through the second focal point to the second optical fingerprint sensor is distanced from a second center of the second optical fingerprint sensor by a fifth distance U2;
wherein the depth information comprise the third distance Z that is calculated by the following equation:

$$Z = B \times (Q/(U1+U2)).$$

10. The fingerprint sensing method of claim 6, further comprising:
performing an image distortion correction and image calibration on the sensed images by the processing circuit;
determining corresponding characteristics between the sensed images by the processing circuit;
generating a disparity map according to the corresponding characteristics by the processing circuit; and
performing a distance calibration and conversion to generate the three-dimensional sensed image having the depth information by the processing circuit.

* * * * *